United States Patent [19]

Boman

[11] Patent Number: 6,055,303

[45] Date of Patent: Apr. 25, 2000

[54] TELECOMMUNICATIONS SERVICES

[75] Inventor: Rune Boman, Haninge, Sweden

[73] Assignee: Telia AB, Farsta, Sweden

[21] Appl. No.: 08/860,467

[22] PCT Filed: Oct. 9, 1996

[86] PCT No.: PCT/SE96/01275

§ 371 Date: Sep. 3, 1997

§ 102(e) Date: Sep. 3, 1997

[87] PCT Pub. No.: WO97/17794

PCT Pub. Date: May 15, 1997

[30] Foreign Application Priority Data

Nov. 10, 1995 [SE] Sweden .................................. 9504037

[51] Int. Cl.[7] .............................. H04M 3/42; H04M 3/48; H04M 7/00

[52] U.S. Cl. .......................... 379/207; 379/209; 379/219; 379/230; 379/901

[58] Field of Search ..................................... 379/201, 207, 379/209, 230, 219, 901

[56] References Cited

U.S. PATENT DOCUMENTS

| | | | |
|---|---|---|---|
| 5,119,415 | 6/1992 | Aoyama | 379/230 X |
| 5,282,244 | 1/1994 | Fuller et al. | 379/230 |
| 5,838,782 | 11/1998 | Lindquist | 379/230 |

FOREIGN PATENT DOCUMENTS

WO 9533347  12/1995  WIPO .............................. H04Q 7/22

Primary Examiner—Harry S. Hong
Attorney, Agent, or Firm—Oblon, Spivak, McClelland, Maier & Neustadt, P.C.

[57] ABSTRACT

A system and method of providing CCBS services over GVNS. In a network service with routing code recalculation, a supplementary subscriber service involves an interaction between two subscribers. Knowledge of a subscriber access code, used in a called subscriber local remote exchange, is required in a calling subscriber local exchange. A subscriber access code is generated by modification of a called subscriber routing code, used by the calling subscriber local exchange. The modification occurs in a transit node of the network service. An interworking problem is then overcome by providing a relay CCBS application service element (CCBS-ASE), in a GVNS transit node, and arranging for end-to-end signaling to be replaced by two TC dialogs, one being the calling parties LE and the relay CCBS-ASE and the other between the called parties LE in the relay CCBS-ASE.

21 Claims, 3 Drawing Sheets

TELECOMMUNICATIONS SERVICES

BACKGROUND OF THE INVENTION

1. Field of the Invention

The present invention relates to the implementation of certain telecommunications services, more particular to a telecommunications system in which such services can be implemented, a method of implementing such services and a transit node for use in the implementation of such services.

2. Description of Related Art

A CCBS (Completion of Calls to Busy Subscriber) service is one example of a subscriber service which uses end-to-end signalling, and in which the service is implemented by operations performed in both a calling subscriber and called subscriber local exchange. Implementation of a CCBS service requires that the calling party's local exchange has knowledge of the called party's subscriber access code, as used in the called party's local exchange.

GVNS (Global Virtual NetworkService) modifies the routing code transmitted by a calling party during transmission, with the result that there is no transparency through the network for the called party's access code, as used in the called party's local exchange.

There is a clear need for the provision of CCBS over GVNS, yet the two service systems appear, at first sight, to be incompatible. Various solutions can be offered for this problem. However, if a solution is to be workable it must take into account the various standards which apply to GVNS and CCBS, and produce a minimum disturbance to these standards.

The present invention provides a solution to the problem of providing CCBS services over GVNS. It should be noted that the present invention has application to interworking between:

any network service with routing code recalculation; and
any supplementary subscriber service involving an interaction between two subscribers in which:
  knowledge of a subscriber access code, used in a called subscriber local remote exchange, is required in a calling subscriber local exchange;
  said subscriber access code is generated by modification of a called subscriber routing code, used by said calling subscriber local exchange; and
  said modification occurs in a transit node of said network service.

The present invention overcomes the problems associated with providing CCBS over GVNS by providing a relay CCBS applications service element, (CCBS-ASE), in a GVNS transit node, and arranging for end-to-end signalling to be replaced by two TC dialogues, one between the calling party's LE and the relay CCBS-ASE and the other between the called party's LE and the relay CCBS-ASE. Of course, if more than one routing code translation occurs, because the signalling is routed via several GVNS transit nodes, a multi-stage chain of TC dialogues may be necessary.

With GVNS, as at present defined, there is nothing to prevent a terminating local exchange sending a CCBS indicator in the backward release message, since that exchange cannot distinguish between a normal call and a GVNS call. The transit nodes, in which the GVNS routing function is performed, lack the ability to delete the CCBS indicator. Thus, the CCBS indicator is repeated all the way back to the originating exchange. The originating exchange is not aware that the call is a GVNS call. Thus, a CCBS request from the calling user will result in a CCBS request being sent, with the called party's number used as a global title, towards the SCCP in the node with the originating GVNS routing function (or towards the node with the GVNS access function). In this node, the SCCP cannot deliver the CCBS request towards a CCBS-ASE, because, the node does not have a CCBS-ASE. Neither can the CCBS request be delivered towards the node where the CCBS-ASE, for the terminating user, is located, because the called party number is not known. The routing number has been translated by the GVNS routing function into the access number for the called party's LE. The CCBS request will fail because of the message return procedure. If no solution is found to this problem, all GVNS calls, for which CCBS is requested, will lead to unnecessary signalling procedures which activate the message return procedure. The problem created by interaction between CCBS and GVNS will not be solved by simply omitting CCBS for GVNS calls. The CCBS request must either be prevented, or some means provided for handling it.

Signal linking is known as such, for example, where translation between the signalling protocols used in different networks is required, e.g. call completion between the fixed network and GSM. However, the present invention is intended for operation within a single network such as the ISDN. The division of the TC dialogue into two linked dialogues is performed within a single network, i.e. in a transit node and not in a gateway between two operator's networks. Furthermore, linking is required because of the interaction between two services, GVNS and CCBS, rather than because the form of the TC dialogues is such that a translation function is needed.

BRIEF DESCRIPTION OF THE INVENTION

According to a first aspect of the present invention, there is provided a telecommunications system comprising a plurality of local exchanges in which signalling and traffic data are routed between remote exchanges via a network service having routing code recalculation, which network service includes a plurality of transit nodes, said telecommunications system being adapted to provide a supplementary subscriber service involving an interaction between two subscribers in which:

knowledge of a subscriber access code, used in a called subscriber local exchange, is required in a calling subscriber local exchange;
said subscriber access code is generated by modification of a called subscriber routing code, used by said called subscriber local exchange; and
said modification occurs in a transit node of said network service, each local exchange having an applications service element for providing said supplementary service, said telecommunications system being characterised in that at least some transit nodes include a relay applications service element which is adapted to relay signalling data between local exchanges and which includes translation means for converting a subscriber access code used at a called subscriber local exchange into a called subscriber routing code used by a calling subscriber exchange, and in that signalling data is transmitted between said calling and said called local exchanges via said relay applications element in said transit node.

One, and only one, transit node through which signalling is transmitted between a called party's local exchange and a calling parties local exchange may include said relay applications service element, so that, in use, a two stage TC chained signalling dialogue is established between said called party's local exchange and said calling party's local exchange.

Two transit nodes through which signalling is transmitted between a called party's local exchange and a calling parties local exchange may include said relay applications service elements, so that, in use, a three stage chained TC signalling dialogue is established between said called party's local exchange and said calling party's local exchange.

Preferably said supplementary subscriber service is a CCBS service.

Preferably said network service having routing code recalculation is a GVNS service.

Preferably said telecommunications system is a single unitary ISDN system.

A CCBS-ASE may be located in each local exchange within said telecommunications system providing CCBS to subscribers connected thereto.

Each of said plurality of transit nodes may be adapted, in use, to receive signalling from a local exchange, providing CCBS to subscribers connected thereto, has a relay CCBS-ASE located therein.

Preferably said relay CCBS-ASE is adapted to change the called party code contained within a received TC signalling dialogue and to perform no other CCBS-ASE function.

According to a second aspect of the present invention, there is provided, in a telecommunications system comprising a plurality of local exchanges in which signalling and traffic data are routed between remote exchanges via a network service having routing code recalculation, which network service includes a plurality of transit nodes, a method of providing a supplementary subscriber service involving an interaction between two subscribers in which:

knowledge of a subscriber access code, used in a called subscriber local remote exchange, is required in a calling subscriber local exchange;

said subscriber access code is generated by modification of a called subscriber routing code, used by said calling subscriber local exchange; and said modification occurs in a transit node of said network service, each local exchange having an applications service element for providing said supplementary service, said method being characterised by:

transmitting signalling data from said called local exchange to a relay applications element located in a transit node, said data including the subscriber access code used at said called subscriber local exchange;

converting said subscriber access code to said subscriber routing code, in said transit node;

modifying said signalling data received from said called subscriber local exchange by substitution of said subscriber routing code for said subscriber access code; and transmitting said modified signalling data to said calling subscriber local exchange.

Signalling data may be transmitted between said called party's local exchange and said calling party's local exchange in a two stage TC chained signalling dialogue, the first stage of which is between a transit node and said called party's local exchange, and the second stage of which is between said calling party's local exchange and the transit node.

Alternatively, signalling data may be transmitted between said called party's local exchange and said calling party's local exchange in a three stage TC chained signalling dialogue, the first stage of which is between a first transit node and said called party's local exchange, the second stage of which is between first and second transit nodes, and the third stage of which is between said calling party's local exchange and said second transit node.

Said supplementary subscriber service may be a CCBS service.

Said network service having routing code recalculation may be a GVNS service.

Said telecommunications system may be a single unitary ISDN system.

Preferably said signalling data is transmitted between CCBS-ASEs located in each local exchange, within said telecommunications system, providing CCBS to subscribers connected thereto.

Preferably said signalling data received at each of said plurality of transit nodes from a local exchange, is processed by a relay CCBS-ASE located in each of said transit nodes.

Said relay CCBS-ASE may change the called party code contained within a received TC signalling dialogue and may perform no other CCBS-ASE function on said signalling data.

According to a third aspect of the present invention, there is provided a network service transit node, for use with the method specified above, characterised in that said transit node includes receiving means for receiving signalling data transmitted from a called local exchange, said data including the subscriber access code used at said remote local exchange, converting means for converting said subscriber access code to a subscriber routing code; signal generating means for generating modified signalling data, from signalling data received by said receiving means, by substitution of said subscriber routing code for said subscriber access code; and transmitting means for transmitting said modified signalling data to said calling subscriber local exchange.

Preferably said converting means is a relay CCBS-ASE.

Preferably said relay CCBS-ASE is adapted to change the called party code contained within a received TC signalling dialogue and to perform no other CCBS-ASE function.

BRIEF DESCRIPTION OF THE SEVERAL VIEWS OF THE DRAWINGS

Embodiments of the invention will now be described, by way of example, with reference to the accompanying drawings, in which.

DETAILED DESCRIPTION OF THE INVENTION

Figure 1:
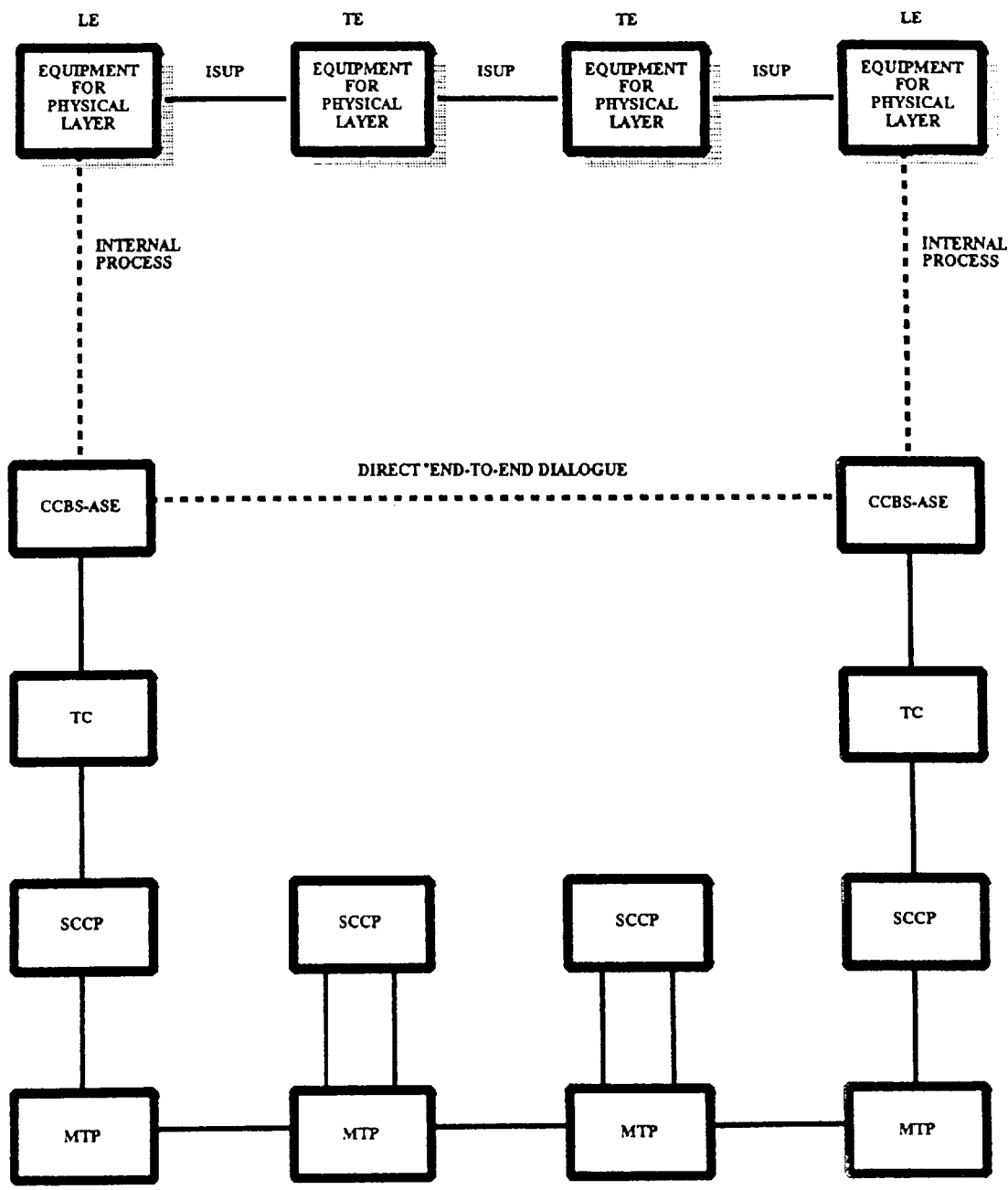
FIG. 1 illustrates the architecture for the protocol stacks of signal system No. 7 for CCBS as standardised by ETSI.

The present invention is described below with reference to the provision of CCBS over GVNS, but as explained above the invention has application to the interworking between other telecommunications services.

In this specification a number of abbreviations and terms of the art are used, their meanings are briefly explained below.

1. A-Subscriber: a calling subscriber
2. A-number: a calling subscriber's E.164 number
3. B-Subscriber: a called subscriber
4. B-number: a called subscriber's E.164 number
5. CCBS: Completion of Calls to Busy Subscriber. An ITU-T standardisation solution is under development and will be published as ITU-T Recommendation Q.733.3. An ETSI solution has been published as ETS 300 356-18.

6. CCBS-ASE: Application Service Element for CCBS, is the service handler for CCBS which, among other things, creates the signalling contents of the dialogues between two CCBS-ASEs, one on the A-Subscriber side and one on the B-Subscriber side.
7. CCNR: Completion of Calls on No Reply
8. DSS1: The signalling protocol used on the subscriber side by a local exchange
9. E.164: ITU-T Recommendation E.164 describes the numbering system scheme for ordinary telephony. The B-Subscriber number and the dialled number are structured, e.g with national elements and area code elements.
10. ETSI: The European Telecommunications Standards Institute.
11. GVNS: Global virtual network service, as specified by ITU-T Recommendation Q.753.6.
12. ISDN: Integrated Services Digital Network.
13. ISUP: ISDN User Part, the signalling protocol used for inter-exchange signalling. The signalling protocol is specified in a new extended edition almost every four years. These are termed, for example, "Blue Book ISUP (1988)", "ISUP.92". Work is currently in progress on a new edition which is expected to be finished in 1996, to be denoted as "ISUP-96". These have been specified by ITU in Recommendation Q.763.
14. ISUP-96: see ISUP
15. LE: Local Exchange
16. MTP:
17. Q.763: ITU-T Recommendation Q.763 describing the ISUP signalling protocol used between telephone exchanges.
18. Q.931: ITU-T Recommendation Q.931 describing the signalling protocol used in subscriber access.
19. REL: Release message, this is the signal message transmitted via ISUP from the B-Subscriber's exchange when the physical connection is disconnected, as occurs in the case of a failed connection when the subscriber is busy.
20. Retain option: This is a variant of the call completion service which allows for a further call completion attempt to be performed, at a later time, if the A-Subscriber is busy when the A-Subscriber's exchange is notified, from the B-Subscriber's exchange, that the B-Subscriber has become free.
21. SSP: Subscriber Service Protocol
22. SCCP: Signalling Connection Control Part, this is a component of signal system No. 7 used to control messages transmitted through the network when the message is addressed to an exchange which does not have a direct connection to the transmitting exchange. SCCP is standardised in ITU-T Recommendations Q.711–Q.716.
23. TC transaction ID: In a TC transaction (transmission of a message) each separate transaction is identified by an identity. This is called a transaction ID. This facilitates a continuing dialogue between two user entities, e.g. two CCBS-ASEs.
24. TC: Transaction Capability Application Part, also known as TCAP, a component of signalling system No 7 used to package information from users in a structured manner. It is described in ITU-T Recommendation Q.771–Q.775.
25. TE: Transit node, e.g. a trunk exchange
26. TNRN:
27. UPT: Universal Personal Telecommunications. An example of a service which the B-Subscriber access code is different from the routing code used at the A-Subscriber's local exchange.
28. VPN: Virtual Private Network To appreciate the problem which is solved by the present invention, it is necessary to consider the way in which CCBS is provided on a normal telephone network and the way in which GVNS operates. CCBS is a supplementary service in which, when a called subscriber's number is engaged, a reverse direction call is established between the called subscriber and the calling subscriber as soon as the called subscriber's terminal equipment goes from the off-hook condition (busy), to the on-hook condition. Operation of such a service requires signalling communications between the terminating local exchanges, which is conventionally established by an "end-to-end" TC dialogue.

FIG. 1 shows the system architecture for the provision of CCBS. It should be noted that CCBS is subject to an existing ETSI standard. CCBS operates by establishing a direct dialogue between CCBS-ASEs located in the local exchanges, LE, of the called and calling parties. The transit nodes, TE, which may be, for example, trunk telephone exchanges, are completely transparent to the signalling dialogue established between the two CCBS-ASEs. In other words, the transit nodes do not change the information contained in the signalling data transmitted between CCBS-ASEs. The upper chain of elements, LE, TE, TE, LE, indicates the physical path between the two local exchanges, over which a call is established in accordance with ISUP. The lower path is that over which signalling data is transmitted. In terms of the protocol stacks, the information moves physically over the path TC, SCCP, MTP, MTP, MTP, MTP, SCCP, TC. However, from the point of view of the signalling dialogue a virtual path exists between the two CCBS-ASEs, as shown by the dotted line.

It should be noted that the SCCPs in the transit nodes, TE, do not effect the signalling data originating from the CCBS-ASEs.

The signalling for the CCBS service is "end-to-end" between the CCBS-ASE containing the CCBS register and the CCBS-ASE containing the CCBS queue. This "end-to-end" signalling is primarily carried by TCs, routed via SCCPs with normal public E.164 numbers, indicating a subscriber access at the local exchange. Interworking with Q.931 accesses are possible but, in this case, the "end-to-end" information flow will not use TCs all the way. This does not, however, effect the information flow itself, only the medium and coding of the information. Throughout the entire public network, (originating national, international and terminating national parts), the information is not analysed above the SCCP level. CCBS-ASEs do not exist in intermediate exchanges. The only exception to this is the CCBS call indicator and the CCBS indicator which are transmitted via ISUP. However, they carry information that is of no relevance in intermediates exchanges, or transit nodes.

A CCBS request is a direct communication between a CCBS register in the originating CCBS-ASE and the CCBS queue in the destination CCBS-ASE. The called party's E.164 number must not be manipulated when signalling data is transmitted between the two CCBS-ASEs, because the signalling is identified by this number and the CCBS register must know the called party number identifying the called party in the CCBS queue location.

It should be noted that the following CCBS functions, among others, are also handled by the "end-to-end" signalling established between the CCBS register in the calling party's CCBS-ASE and the CCBS queue in the called party's CCBS-ASE:

CCBS Cancel;
CCBS Suspend;
CCBS Resume; and
Retain option.

None of these functions are dependant on signalling transparency between the two CCBS-ASES.

Figure 2:
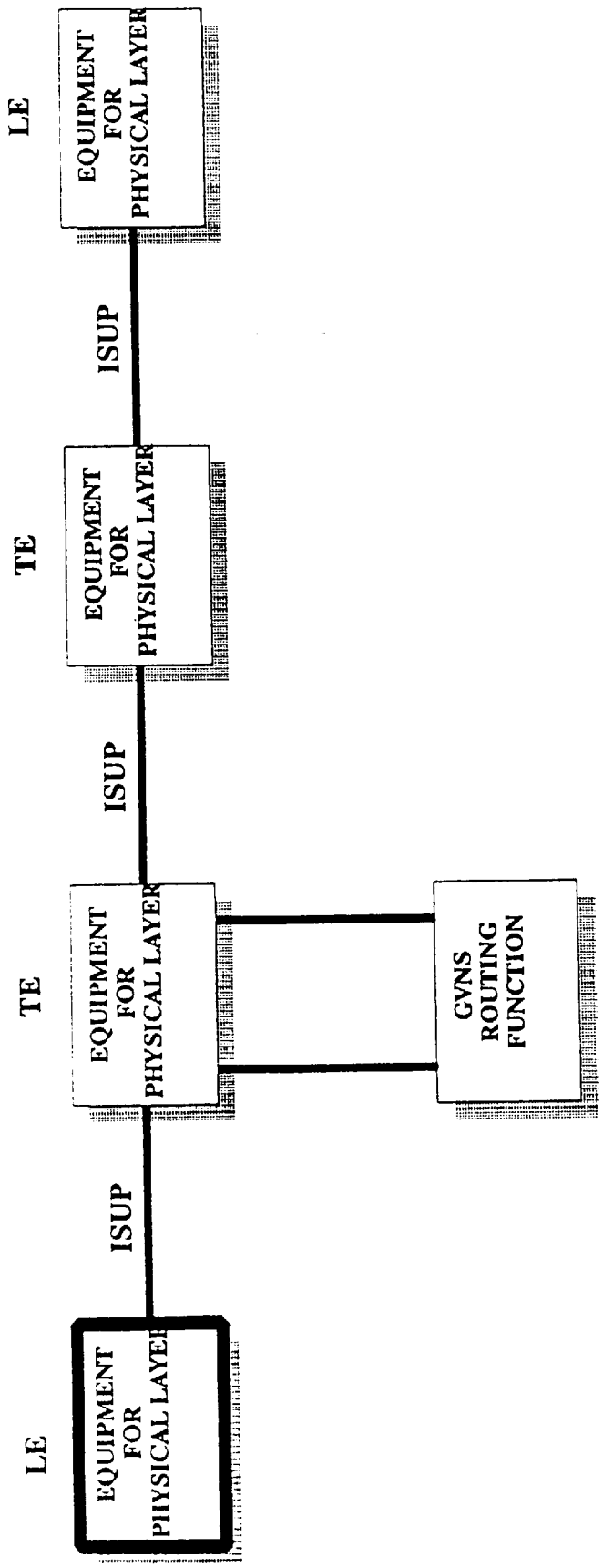
FIG. 2 illustrates the architecture for the protocol stacks of signal system No. 7 for GVNS as standardised in ITU-T.

FIG. 2 shows the architecture standardised for GVNS in ITU-T. The signalling data travels along the same physical connection over which the call is established. One, or more of the transit nodes, TE, may include a GVNS routing function. The GVNS routing function modifies the called subscriber routing code to facilitate the call connection.

The functional entities used to operate GVNS are located in GVNS gateways and operate with database support. A GVNS gateway could be located in a local exchange, but this is only one option. A more usual arrangement would be to locate GVNS gateways in transit exchanges, (trunk exchanges, or transit nodes), or international gateways. There are two types of GVNS functional entity, namely those handling GVNS access functions and those handling GVNS routing functions. The routing functions are performed in both the originating participating service providers network and in the terminating participating service providers network. The routing functions manipulate the subscriber access/routing codes. This means that GVNS is not "end-to-end" transparent, since the called subscribers E.164 number is modified by a recalculation procedure.

Thus, CCBS requires "End-to-end" transparency which GVNS does not provide.

The CCBS service uses the called party's E.164 number. The same number is used in the CCBS register, for later CCBS call set-up, and in the CCBS queue for monitoring of the called subscriber and identification of the received CCBS call. If this were not done, the called subscriber in the original call, the CCBS request and the CCBS call cannot be tied to each other. Only the CCBS request and the CCBS recall could be tied together, (if a recall were possible, which, without the present invention, it is not), since the TC transaction ID is used in this case. Other signalling information used by the CCBS-ASE has no relevance to routing information and is not affected by GVNS.

The GVNS routing function manipulates the called party number. The originating GVNS routing function creates, by use of data received from a data base, the terminating network routing number instead of the terminating participating service provider identification. The terminating GVNS routing function may convert the received terminating network routing number to another terminating network routing number used in that network but, on the other hand, may leave the number unchanged. In any case, the originating local exchange and the destination local exchange are not aware of the same called party number.

The basic interworking problem for CCBS is that, for a GVNS call, the functional entities, where the CCBS register and the CCBS queue are located, do not identify the called subscriber with the same E.164 called party number. They are not aware of the number used at the remote location. Since the CCBS service is based on usage of the same number in the CCBS register and the CCBS queue, the service will not work over GVNS without additional procedures in either CCBS, GVNS, or both.

The called party number used at the destination is known only by the terminating local exchange and by the terminating GVNS routing function. Since the terminating local exchange does not know that the call is a GVNS call, (and, therefore, that special procedures should be applied), the node with the terminating GVNS routing function must send that number back to the originating local exchange, (or where appropriate the originating private network PABX), when the called user is busy, (or where there is congestion at the interworking point with private networks). The only message sent in this call state is REL. A new parameter, or the backward GVNS parameter with the addition of TURN (which amounts to a new parameter) has to be added to the REL message to carry this number. If the connected number is used, the originating local exchange will not know that special CCBS procedures will apply. In any case the connected number is not included in the REL message.

If the called party number used at the destination exchange can be received by the originating local exchange, this number could be used in the CCBS request, instead of the stored called party number, (i.e. the dialled number). The recall would work in these circumstances.

When a CCBS call is set up, the originating local exchange must use the stored called party number (i.e. the dialled number) and not the received number (i.e. the number used at the destination and in the CCBS request operation), since the number in the CCBS call set-up should be manipulated, in the same way as for the original call, in the GVNS routing functions and the resulting called party number, received by the destination local exchange, will be the same as the number stored in the CCBS queue. If the converted number is used for the CCBS call from the originating local exchange, the conversion in the GVNS routing functions will not work, since it is the wrong number which is used as input to the conversion.

Figure 3:
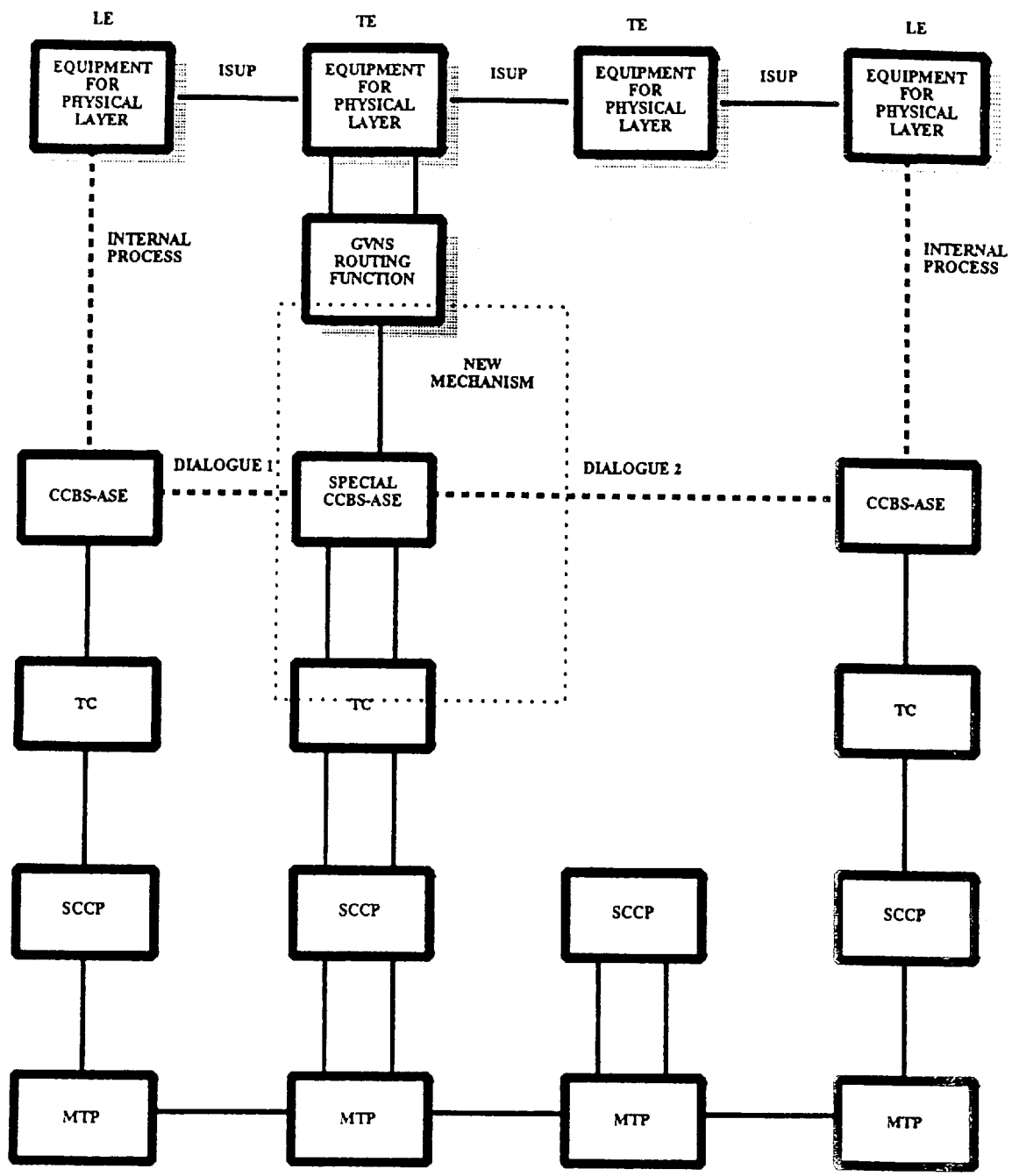
FIG. 3 illustrates the architecture for the protocol stacks of signal system No. 7, according to the present invention, for provision of CCBS over GVNS.

The solution to this problem, proposed by the present invention, is illustrated in FIG. 3. A special, or relay, CCBS-ASE is provided in transit nodes having GVNS routing functions, i.e. those transit nodes which cause loss of transparency between the ends of the signalling link. The end-to-end dialogue between the called party's CCBS-ASE and the calling party's CCBS-ASE is replaced by a chained dialogue via the relay CCBS-ASEs. In FIG. 3, a two step chained dialogue is used. The only function of the relay CCBS-ASE is to relay the CCBS operations in those transit nodes in which the originating and terminating GVNS routing functions are located. All CCBS operations consist of 2, or 3, TC dialogues linked to each other in a chain.

This method requires that TC operations be linked in a chain and that the relay CCBS-ASE can be addressed with the same called party number used as a global title for the SCCP addressing and used by ISUP network for reaching the GVNS routing function located in the same transit node as the relay CCBS-ASE.

The relay CCBS-ASE receives the CCBS request. The only parameter which it examines is the called party number. The relay CCBS-ASE uses the GVNS routing function, located in the same node, to obtain a new called party number. The calculation has to be repeated since the original calculation is not stored. This number then replaces the received number in the called party number parameter in the next link of the dialogue chain. This linkage between the dialogues must be maintained as long as the dialogues exist. All other parameters in the CCBS request are repeated unchanged, The relay CCBS-ASE is very much simpler than a normal CCBS-ASE because it does not have to provide:

monitoring of called, or calling access;

creation of a CCBS call indicator;

creation of a CCBS indicator;

a CCBS register;

a CCBS queue;

check of free terminal at incoming CCBS call suspend, or resume, functions;

retain option procedures; and generation of information towards the DSS1.

All these features are provided by a normal CCBS-ASE.

Thus the present invention provides for CCBS to be realised by:
- receiving the called party's number information in the TC dialogue;
- substituting the recalculated called party's number; and
- forwarding this in a new TC dialogue, routed (by the SCCP), towards the end destination for this new number.

In this way signalling information needed for the realisation of CCBS is relayed between the CCBS-ASEs located in the local exchanges to which calling and called party are connected.

The TC transaction IDs used in the chained dialogues are registered so that subsequent operations in the dialogue may also be relayed between the two local exchanges.

Use of the relay CCBS-ASE solution means that no additions need be made to the signalling protocols used for either GVNS, or CCBS. The CCBS supplementary service realised in the local exchange is not affected at all. The relay CCBS-ASE is only required where CCBS interacts with GVNS and can, therefore, be limited to transit nodes where the GVNS routing function is located. Thus, the interworking problem can be resolved, in accordance with the present invention, entirely within GVNS, without affecting the existing CCBS implementations.

The inventive concept resides in the use of a TC application to create a linking between two TC dialogues chained in series. The application can interpret the parameter in the TC dialogue operations containing the B-number and change it to a new B-number by collecting this from another service's function.

The invention has application in all connection set-ups in which the following service combinations exist:
- completion of calls—GVNS;
- completion of calls—VPN;
- completion of calls—free number group;
- completion of calls—personal number service (Telia Persona); and
- completion of calls—Intelligent Network services having number recalculation in SSP.

The invention is not limited to completion of calls, but can be used for any supplementary service using service logic distributed between two local exchanges, communicating with TC dialogues, in those cases where the services interact with other services performing B-number recalculation.

What is claimed is:

1. A telecommunications system comprising a plurality of local exchanges in which signalling and traffic data are routed between remote exchanges via a network service having routing code recalculation, which network service includes a plurality of transit nodes, said telecommunications system being adapted to provide a supplementary subscriber service involving an interaction between two subscribers in which:
    knowledge of a subscriber access code, used in a called subscriber local exchange, is required in a calling subscriber local exchange;
    said subscriber access code is generated by modification of a called subscriber routing code, used by said called subscriber local exchange; and
    said modification occurs in a transit node of said network service,
each local exchange having an applications service element for providing said supplementary service, said telecommunications system being characterised in that at least some transit nodes include a relay applications service element which is adapted to relay signalling data between local exchanges and which includes translation means for converting a subscriber access code used at a called subscriber local exchange into a called subscriber routing code used by a calling subscriber exchange, and in that signalling data is transmitted between said calling and said called local exchanges via said relay applications element in said transit node.

2. A telecommunications system as claimed in claim 1 characterised in that one, and only one, transit node through which signalling is transmitted between a called party's local exchange and a calling parties local exchange includes said relay applications service element, so that, in use, a two stage TC chained signalling dialogue is established between said called party's local exchange and said calling party's local exchange.

3. A telecommunications system as claimed in claim 1, characterised in that two transit nodes through which signalling is transmitted between a called party's local exchange and a calling parties local exchange include said relay applications service elements, so that, in use, a three stage chained TC signalling dialogue is established between said called party's local exchange and said calling party's local exchange.

4. A telecommunications system as claimed in claim 1, characterised in that said supplementary subscriber service is a CCBS service.

5. A telecommunications system as claimed in claim 1, characterised in that said network service having routing code recalculation is a GVNS service.

6. A telecommunications system as claimed in claim 1, characterised in that said telecommunications system is a single unitary ISDN system.

7. A telecommunications system as claimed in claim 4, characterised in that a CCBS-ASE is located in each local exchange within said telecommunications system providing CCBS to subscribers connected thereto.

8. A telecommunications system as claimed in claim 4, characterised in that each of said plurality of transit nodes which is adapted, in use, to receive signalling from a local exchange, providing CCBS to subscribers connected thereto, has a relay CCBS-ASE located therein.

9. A telecommunications system as claimed in claim 8, characterised in that said relay CCBS-ASE is adapted to change the called party code contained within a received TC signalling dialogue and to perform no other CCBS-ASE function.

10. In a telecommunications system comprising a plurality of local exchanges in which signalling and traffic data are routed between remote exchanges via a network service having routing code recalculation, which network service includes a plurality of transit nodes, a method of providing a supplementary subscriber service involving an interaction between two subscribers in which:
    knowledge of a subscriber access code, used in a called subscriber local remote exchange, is required in a calling subscriber local exchange;
    said subscriber access code is generated by modification of a called subscriber routing code, used by said calling subscriber local exchange; and
    said modification occurs in a transit node of said network service,
each local exchange having an applications service element for providing said supplementary service, said method being characterised by:

transmitting signalling data from said called local exchange to a relay applications element located in a transit node, said data including the subscriber access code used at said called subscriber local exchange;

converting said subscriber access code to said subscriber routing code, in said transit node;

modifying said signalling data received from said called subscriber local exchange by substitution of said subscriber routing code for said subscriber access code; and transmitting said modified signalling data to said calling subscriber local exchange.

11. A method as claimed in claim 10 characterised by transmitting signalling data between said called party's local exchange and said calling party's local exchange in a two stage TC chained signalling dialogue, the first stage of which is between a transit node and said called party's local exchange, and the second stage of which is between said calling party's local exchange and the transit node.

12. A method as claimed in claim 10, characterised by transmitting signalling data between said called party's local exchange and said calling party's local exchange in a three stage TC chained signalling dialogue, the first stage of which is between a first transit node and said called party's local exchange, the second stage of which is between first and second transit nodes, and the third stage of which is between said calling party's local exchange and said second transit node.

13. A method as claimed in claim 10, characterised in that said supplementary subscriber service is a CCBS service.

14. A method as claimed in claim 10, characterised in that said network service having routing code recalculation is a GVNS service.

15. A method as claimed in claim 10, characterised in that said telecommunications system is a single unitary ISDN system.

16. A method as claimed in claim 13, characterised by transmitting said signalling data between CCBS-ASEs located in each local exchange, within said telecommunications system, providing CCBS to subscribers connected thereto.

17. A method as claimed in claim 13, characterised by processing said signalling data received at each of said plurality of transit nodes from a local exchange, in a relay CCBS-ASE located in each of said transit nodes.

18. A method as claimed in claim 17, characterised by, in said relay CCBS-ASE, changing the called party code contained within a received TC signalling dialogue and performing no other CCBS-ASE function on said signalling data.

19. A network service transit node for use with the method as claimed in claim 10, characterised in that said transit node includes receiving means for receiving signalling data transmitted from a called local exchange, said data including the subscriber access code used at said remote local exchange, converting means for converting said subscriber access code to a subscriber routing code; signal generating means for generating modified signalling data, from signalling data received by said receiving means, by substitution of said subscriber routing code for said subscriber access code; and transmitting means for transmitting said modified signalling data to said calling subscriber local exchange.

20. A network service transit node as claimed in claim 19, characterised in that said converting means is a relay CCBS-ASE.

21. A telecommunications system as claimed in claim 20, characterised in that said relay CCBS-ASE is adapted to change the called party code contained within a received TC signalling dialogue and to perform no other CCBS-ASE function.

* * * * *